United States Patent [19]

Tsai

[11] Patent Number: 5,677,777
[45] Date of Patent: Oct. 14, 1997

[54] APPARATUS FOR SCANNING AN ORIGINAL SHEET BY MEANS OF REFLECTIVE LIGHT AND TRANSMITTED LIGHT

[75] Inventor: Jenn-Tsair Tsai, Tao-Yuan, Taiwan

[73] Assignee: Must Systems, Inc., Hsinchu, Taiwan

[21] Appl. No.: 639,451

[22] Filed: Apr. 29, 1996

[51] Int. Cl.⁶ .................................................. H04N 1/04
[52] U.S. Cl. ........................................... 358/475; 358/498
[58] Field of Search ................................. 358/473–475, 358/487, 492, 498, 505–506, 509; 399/202, 220–221, 374, 377–380

[56] References Cited

U.S. PATENT DOCUMENTS 5,523,876  6/1996  Tellam et al. ........................... 358/474
5,532,846  7/1996  Brook et al. ............................ 358/474

*Primary Examiner*—Edward L. Coles, Sr.
*Assistant Examiner*—Stephen Brinich
*Attorney, Agent, or Firm*—Harness, Dickey & Pierce, P.L.C.

[57] ABSTRACT

The invention disclosed a scanner with the function of providing transmitted light source and reflective light source which can be adapted to the location of a floppy diskette driver of a computer. The invention mainly includes a double-function carriage loaded with a transmitted light source and a reflective light source and a gap therebetween for allowing a transparent document tray to pass through. When scanning, a driving device moves the double-function carriage in longitudinal direction along the sheet to complete the exposure of the entire sheet.

20 Claims, 3 Drawing Sheets

APPARATUS FOR SCANNING AN ORIGINAL SHEET BY MEANS OF REFLECTIVE LIGHT AND TRANSMITTED LIGHT

BACKGROUND OF THE INVENTION

A. Field of the Invention

The invention relates to an apparatus for reading image from an original sheet by means of transmitted light and reflective light, especially to an apparatus with an internal document tray which can be adapted to the floppy diskette driver of a computer.

B. Description of the Prior Art

Most scanners capable of scanning an original sheet by means of reflective light and transmitted light are external. Usually, the optical module for emitting transmitted light is attached to the optical module for emitting reflective light. Refer to FIG. 1, housing 101 includes an optical module 102 for emitting reflective light and reading image information. On top of the housing 101, there is a sheet cover 103. The optical module 104 for emitting transmitted light is hidden in the sheet cover 103. The optical module for emitting reflective light includes at least a straight-tube fluorescent lamp 105, a CCD line image sensor 106, and an array of mirrors 107, 108, and 109. When scanning an original sheet, the sheet is placed on top of a document tray 111 made of glass or PVC. The straight-tube fluorescent lamp 105 emits a light beam shone onto the sheet. The light beam is then guided to a CCD line image sensor 106 via an array of mirrors 107, 108, and 109. First driving device 110 moves optical module 102 in longitudinal direction of the document tray 111 to complete the exposure of the entire sheet.

On the other hand, the optical module for emitting transmitted light 104 includes a straight-tube fluorescent lamp 112 and a second driving device 113. When scanning a transparent sheet, the straight-tube fluorescent lamp 112 emits a light beam shone through the sheet placed on the document tray 111. The array of mirrors 107, 108 and 109 then guide the transmitted light beam to the CCD line image sensor 106. Second driving device 113 then moves the straight-tube fluorescent lamp 112 along the surface of the sheet to complete the exposure of the entire sheet.

The structure of an external scanner is complicated because it needs two driving devices and control mechanisms for moving the two optical modules. Besides, its size is larger because each optical module is mounted on different support devices for sliding back and forth. Considering this structure, it is difficult to integrate an external scanner with a computer and reduce the size of the scanner to the size of a floppy diskette driver.

SUMMARY OF THE INVENTION

It is therefore the object of the invention to provide an apparatus with an internal document tray for scanning an original sheet by means of transmitted light and reflective light.

It is another object of the invention to provide a double-function carriage loaded with a transmitted light source and a reflective light source and a gap in the middle to simplify the structure of a scanner.

It is still another object of the invention to provide a simple-structure scanner which is easy to assemble and thus can reduce the manufacture cost of the scanner.

It is yet a further object of the invention to provide a compact scanner which can be adapted to the location of a floppy diskette driver of the computer.

It is still another object of the invention to provide a double-function carriage which can be adapted to a conventional external scanner.

These and other objects of the invention, which will become more apparent as the invention is described more fully below, are obtained by providing an apparatus with an internal document tray which can scan an original sheet by means of transmitted light and reflective light. The invention mainly includes a double-function carriage loaded with a transmitted light source and a reflective light source facing each other and a gap interposed therebetween for allowing the internal document tray to pass through. When scanning a transparent sheet, the transmitted light source is on while the reflective light source is off. On the other hand, when scanning a piece of paper, the transmitted light source is off while the reflective light source is on. The light beam shone onto the sheet is guided to a line image sensor via an array of mirrors. The line image sensor then converts the image information into digital signals for the computer to read. When scanning, a driving device moves the carriage in longitudinal direction along the surface of the sheet to complete the exposure of the entire sheet.

DETAILED DESCRIPTION OF THE PREFERRED EMBODIMENTS

Figure 1:
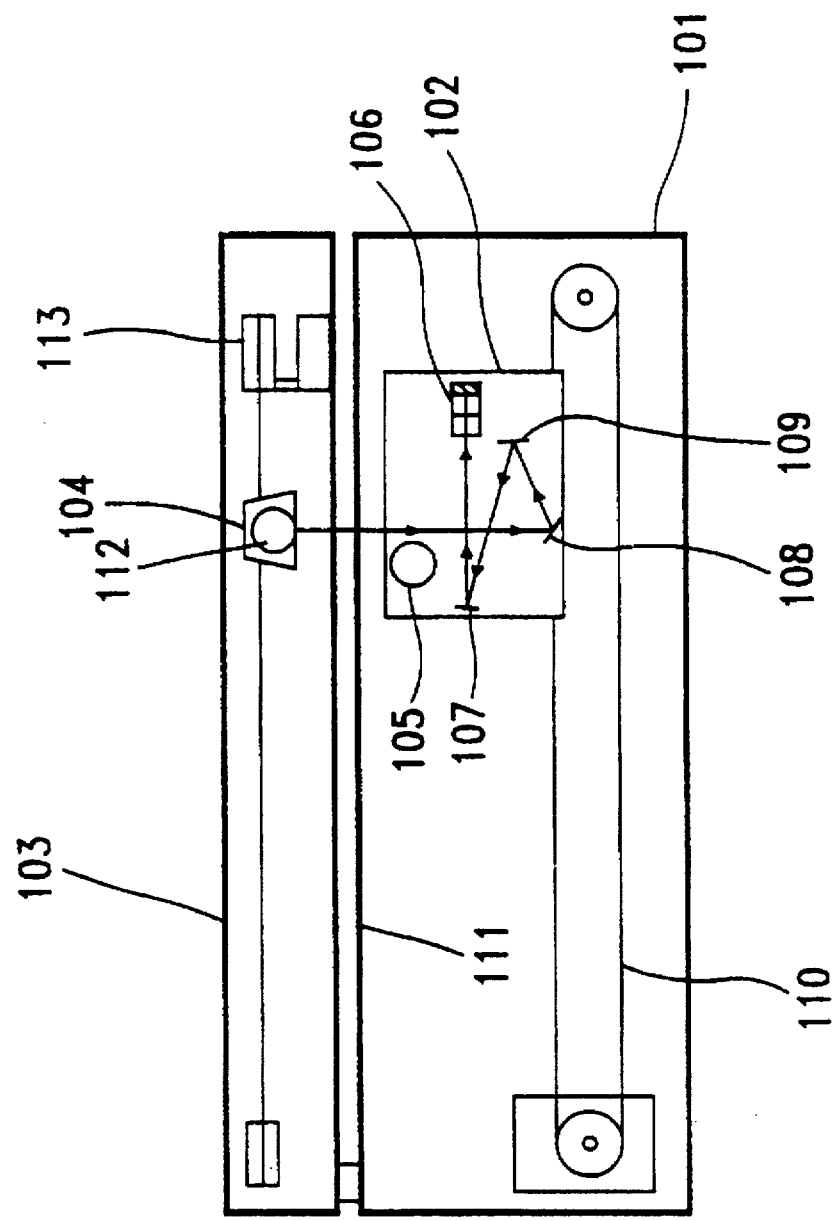
FIG. 1 is a schematic diagram showing the sectional side-view of a conventional scanner.
Figure 2:
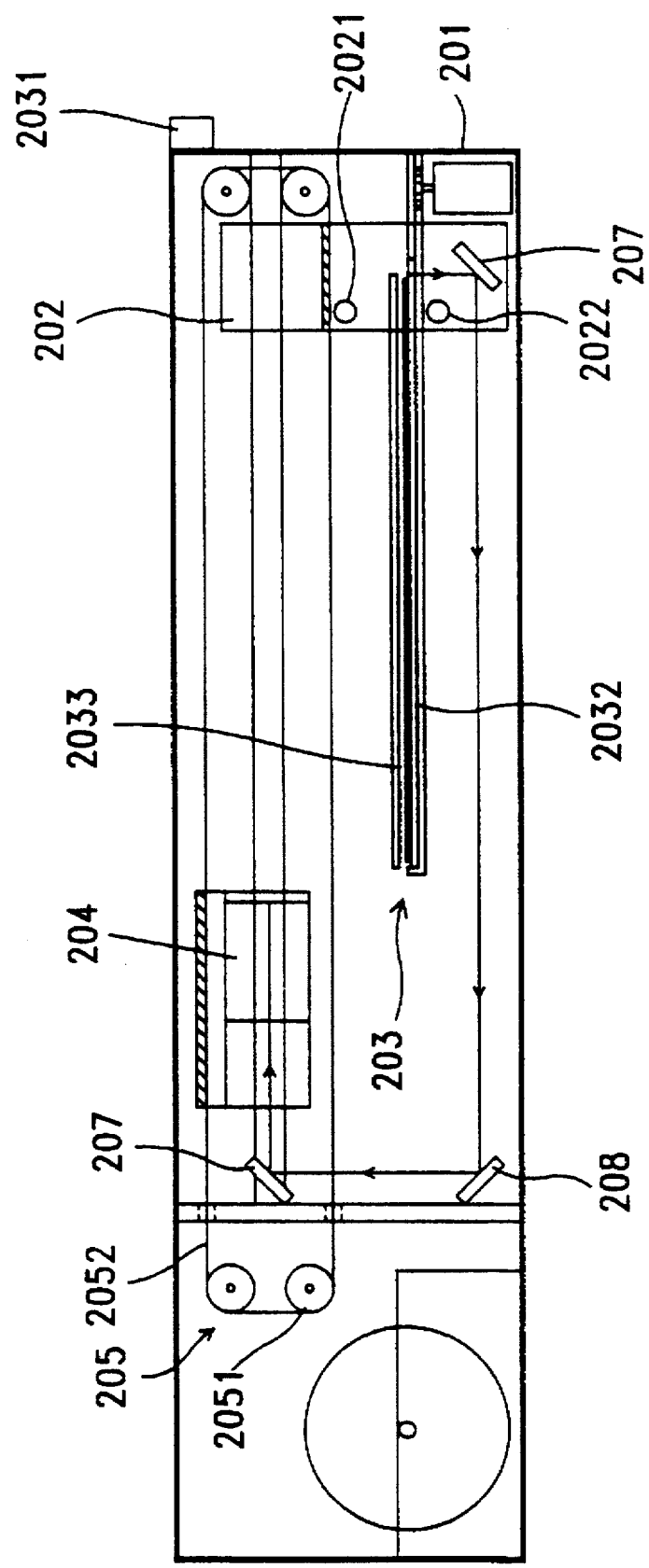
FIG. 2 is a perspective view schematically showing the side-view of a preferred embodiment of the invention.

An embodiment of the present invention will now be described with reference to the accompanying drawings. Refer to FIG. 2, the invention is contained in a compact housing 201 which mainly includes a double-function carriage 202, a transparent document tray 203, a photoelectric converting unit 204, and a driving device 205.

The double-function carriage 202 has a gap in the middle and a transmitted light source 2021 at the top and a reflective light source 2022 at the bottom. The operation of the transmitted light source 2021 and the reflective light source 2022 is controlled by a selecting device (not show). When scanning a transparent sheet, the transmitted light source 2021 is on while the reflective light source 2022 is off. On the other hand, when scanning a piece of paper, the reflective light source 2022 is on while the transmitted light source 2021 is off. The selecting device can be implemented in either software or hardware. It depends on the application. The double-function carriage 202 is mounted on a first support device 206 and driven by a driving device 205, thereby to move in longitudinal direction along the surface of the sheet.

The transparent document tray 203 is disposed at the gap of the double-function carriage 202. It is made of transparent material like glass or PVC. Above the document tray 203, there is a transparent sheet cover 2033 for fixing the sheet. The movement of the transparent document tray 203 is controlled by a controller 2031. Since the document tray 2032 and the sheet cover 2033 are transparent, it is easy for the light beam to pass through. The light beam is then guided to a photoelectric converting unit 204 via an array of optical members, like mirrors 207, 208, and 209. The photoelectric covering unit 204 is mounted on second support device 210 opposite to double-function carriage 202 with the maximum distance of the length of the document tray 2032.

Photoelectric converting unit 204 is implemented as a line image sensor, such as a CCD line image sensor or a CIS line image sensor, for converting image information into electric signals. When scanning, a motor (not shown) drives rotating devices 2051 which further drives conveying device 2052. Conveying device 2052 can be a conveyor belt or a steel wire rope in a shape of a single closed loop. Conveying device 2052 will move double-function carriage 202 in longitudinal direction along the surface of the sheet and through the document tray 2032 via the gap of the double-function carriage 202, thereby to complete the exposure of the entire sheet.

The operation of the invention is as follows: first press controller 2031 on the surface of the housing 201 to move document tray 2032 out from housing 201. Then load the sheet on document tray 2032. Fix the sheet with sheet cover 2033. Push controller 2031 again to move document tray 2032 back to the housing 201. Use selecting device (not shown) to operate transmitted light source 2021 and reflective light source 2022. When the motor is energized, it drives rotating devices 2051, such as pulleys, and conveying device 2052 which moves double-function carriage 202. As double-function carriage 202 is driven along the surface of the sheet, the gap of the carriage 202 allows document tray 2032 to pass through. The light beam shone onto the sheet is then guided to a photoelectric converting unit 204 via an array of mirrors 207, 208, and 209. When the scanning is complete, double-function carriage 202 returns to original position for next scanning job.

Figure 3:
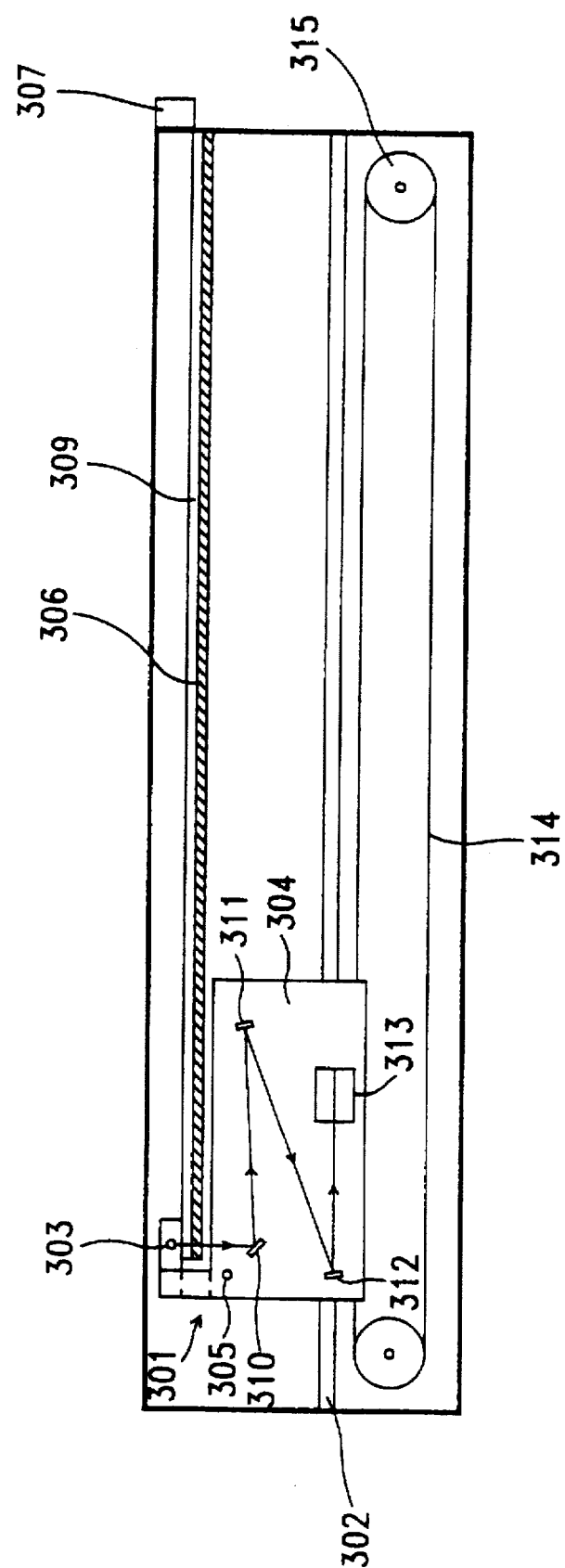
FIG. 3 is another perspective view schematically showing the state in which the double-function carriage of the invention is adapted to a conventional external scanner.

The double-function carriage 202 as disclosed in FIG. 2 can also be applied to a conventional external scanner to simply its driving mechanism and structure. Refer to FIG. 3, double-function carriage 301 is mounted on support device 302 for moving back and forth. On top of the double-function carriage 301, there is a transmitted light source 303. In the middle of the double-function carriage 301, there is a gap. At the bottom of the double-function carriage 301, there is an image processing unit 304. Image processing unit 304 mainly includes a reflective light source 305, an array of optical members, such as mirrors 310,311,312, and a photoelectric converting element 313, such as a CCD line image sensor or a CIS line image sensor.

A document tray 306 is disposed between transmitted light source 303 and reflective light source 305 for locating an original sheet. The document tray 306 is also made of transparent material like PVC or glass. It includes a sheet cover 309, and a controller 307. The operation of the direction of light source depends on a selecting device (not shown). The light beam shone on the sheet is guided to the photoelectric converting element 313 to be converted to electric signals. When the motor is energized, it drives rotating devices 315 which moves conveying device 314. Conveying device 314 drives double-function carriage 301 in longitudinal direction along the surface of the sheet and thus complete the exposure of the sheet.

The double-function carriage of the invention simplifies the driving mechanism for scanning a transparent sheet or a piece of paper. Therefore, the invention can be so compact that it can be integrated with a computer and built in the location of the floppy diskette driver of a computer. Moreover, the invention is easy to assemble and can further save the manufacture cost of the apparatus.

It should be understood that various alternatives to the structures described herein may be employed in practicing the present invention. It is intended that the following claims define the invention and that the structure within the scope of these claims and their equivalents be covered thereby.

What is claimed is:

1. An apparatus for reading information from an original sheet comprising:

double-function carrying means for providing a light beam shone on said original sheet, said carrying means mounted on first support means comprising a transmitted light source and a reflective light source facing each other with a gap interposed therebetween;

a transparent document tray for supporting said original sheet disposed between said transmitted light source and said reflective light source;

photoelectric converting means mounted on second support means opposite to said double-function carrying means for converting said light beam into electric signals; and driving means connecting to said double-function carrying means for moving said double-function carrying means along the surface of said original sheet, thereby to complete the exposure of the entire sheet.

2. The apparatus as claimed in claim 1 further comprising:

a plurality of optical members for guiding said light beam emitted from said transmitted light source and said reflective light source to said photoelectric converting means.

3. The apparatus as claimed in claim 1 further comprising:

selecting means for operating said transmitted light source and said reflective light source.

4. The apparatus as claimed in claim 1, wherein said transparent document tray further comprising:

controlling means on the surface of a compact housing for operating the movement of said document tray; and a transparent sheet cover for fixing said original sheet placed on said document tray.

5. The apparatus as claimed in claim 1, wherein said photoelectric converting means comprising a CCD line image sensor.

6. The apparatus as claimed in claim 1, wherein said photoelectric converting means comprising a CIS line image sensor.

7. The apparatus as claimed in claim 1, wherein said driving means comprises:

a plurality of rotating means disposed at the two sides of said first support means and said second support means for being driven by a motor; and conveying means connecting to said rotating means and said double-function carrying means for moving said double-function carrying means along the surface of said original sheet.

8. The apparatus as claimed in claim 7, wherein said conveying means is a conveyor belt or a steel wire rope in a shape of a single closed loop.

9. An optical module adapted to a scanner for providing a transmitted light beam and a reflective light beam shone on an original sheet, thereby to expose the entire sheet, and said scanner comprising at least a photoelectric converting unit mounted on support means for converting said light beam into electric signals, said optical module comprising:

carrying means with a gap in the middle mounted on said support means opposite to said photoelectric converting unit;

a first lamp disposed on top of said carrying means for providing a transmitted light beam;

a second lamp disposed at the bottom of said carrying means for providing a reflective light beam;

a transparent document tray disposed between said first lamp and said second lamp for supporting said original sheet; and driving means connecting to said carrying means for moving said document tray along the surface of said original sheet and through said gap of said carrying means.

10. The apparatus as claimed in claim 9 further comprising:

a plurality of optical members for guiding said transmitted light beam and said reflective light beam to said photoelectric converting means.

11. The apparatus as claimed in claim 9, wherein said transparent document tray further comprising:

a transparent sheet cover for fixing said original sheet; and controlling means disposed on the surface of a compact housing for operating the movement of said transparent document tray.

12. The apparatus as claimed in claim 9, wherein said driving means comprises:

a plurality of rotating means disposed at the two sides of said first support means and said second support means for being driven by a motor; and conveying means connecting to said rotating means and said double-function carrying means for moving said double-function carrying means back and forth on said first support means.

13. The apparatus as claimed in claim 12, wherein said conveying means is a conveyor belt or a steel wire rope in a shape of single closed loop.

14. The apparatus as claimed in claim 9 further comprising:

selecting means for operating said first lamp and said second lamp.

15. An apparatus for reading information from an original sheet comprising:

carrying means with a gap in the middle mounted on support means;

a first lamp disposed on top of said carrying means for emitting a transmitted light beam;

image processing means for converting image information into electric signals, said image processing means disposed at the bottom of said carrying means comprising a second lamp for emitting a reflective light beam;

a transparent document tray disposed at said gap of said carrying means for supporting said original sheet; and driving means connecting to said carrying means for driving said carrying means along the surface of said original sheet and through said gap of said carrying means.

16. The apparatus as claimed in claim 15, wherein said image processing means comprising:

a CCD line image sensor located at the bottom; and a plurality of optical members for guiding said transmitted light beam and said reflective light beam to said CCD line image sensor.

17. The apparatus as claimed in claim 15, wherein said image processing means comprises:

a CIS line image sensor located at the bottom; and a plurality of optical members for guiding said transmitted light beam and said reflective light beam to said CIS line image sensor.

18. The apparatus as claimed in claim 15, wherein said document tray further comprising:

controlling means disposed on the surface of a housing for controlling the movement of said document tray; and a transparent sheet cover for fixing said original sheet placed on said transparent document tray.

19. The apparatus as claimed in claim 15, wherein said driving means comprising:

a plurality of rotating means disposed at the two sides of said support means for being driven by a motor; and conveying means connecting to said rotating means and said carrying means for moving said carrying means in longitudinal direction along the surface of said original sheet.

20. The apparatus as claimed in claim 15 further comprising:

selecting means for operating said first lamp and said second lamp.

* * * * *